United States Patent

[11] 3,551,765

| [72] | Inventor | Takao Miyasaka<br>Yokohama, Japan |
|---|---|---|
| [21] | Appl. No. | 708,636 |
| [22] | Filed | Feb. 27, 1968 |
| [45] | Patented | Dec. 29, 1970 |
| [73] | Assignee | Victor Company of Japan Limited<br>Yokohama City, Japan<br>a corporation of Japan |
| [32] | Priority | Mar. 3, 1967 |
| [33] | | Japan |
| [31] | | No. 42/13456 |

[54] COMMUTATORLESS MOTOR
5 Claims, 5 Drawing Figs.

[52] U.S. Cl................................................ 318/138,
318/166, 318/227
[51] Int. Cl................................................ H02p 7/28
[50] Field of Search........................................... 318/138,
254, 227, 231, 439, 166

[56] References Cited
UNITED STATES PATENTS

| 3,090,897 | 3/1963 | Hammann.................... | 318/138 |
| 3,124,735 | 3/1964 | Sampietro et al............. | 318/138 |
| 3,297,928 | 1/1967 | Von Delden .................. | 318/138 |
| 3,321,661 | 3/1967 | Toth et al. .................... | 318/138 |
| 3,324,368 | 6/1967 | Von Delden .................. | 318/138 |
| 3,416,057 | 12/1968 | Froyd et al.................... | 318/138X |

*Primary Examiner*—G. R. Simmons
*Attorney*—Sparrow and Sparrow

ABSTRACT: A commutatorless motor for use with a DC power source including a three-phase inverter circuit formed by field coils of symmetrical three-phase detection coils, each in the same phase as each of said field coils. Transistor circuits are disposed outwardly of the motor with each connected to each of said coils, whereby rotating fields are generated in the motor stator by said field coils to rotate the motor rotor.

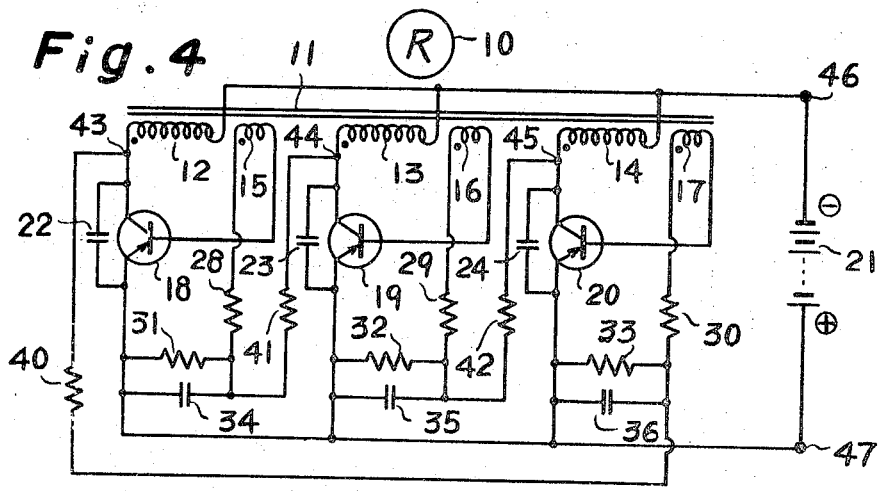
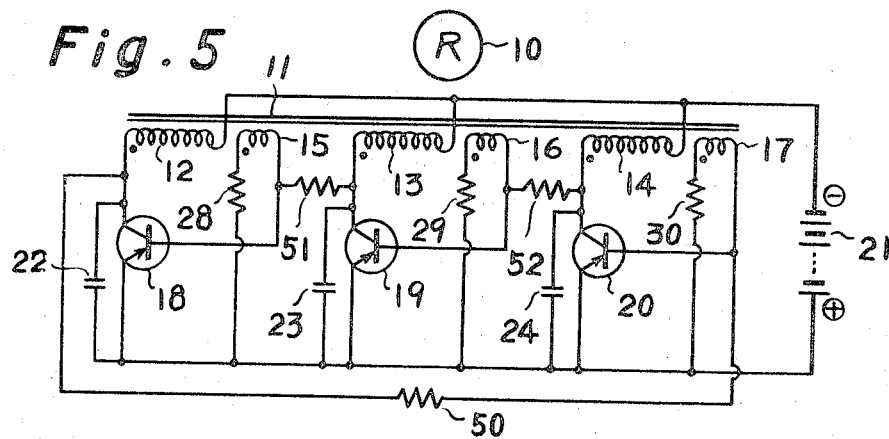
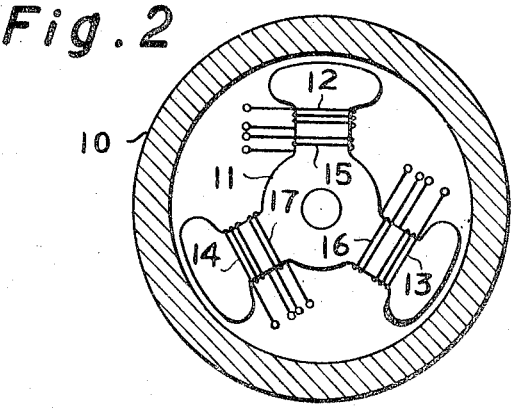

COMMUTATORLESS MOTOR

The present invention relates to a commutatorless motor, and particularly to a commutatorless motor which utilizes field coils of three-phase arrangement for constituting a three-phase inverter circuit, and which is to be actuated by a DC power source.

An inverter device has, heretofore, been used where AC motor such as induction motor or synchronous motor has been operated by the use of DC power source. Such a conventional inverter device has shortcomings in that it necessitates an output transformer which results in loss of energy and decreases in efficiency, and the device, furthermore, is inevitably of large scale.

A primary object of the present invention is to provide a commutatorless motor actuated by DC power source and having an inverter circuit which does not necessitate an output transformer.

Another object of the present invention is to provide a commutatorless motor having an inverter circuit of simplified construction wherein field coils of the motor also act as a transformer of the inverter circuit.

A further object of the present invention is to provide a commutatorless motor having a symmetrical three-phase inverter of simplified circuit construction.

A further object of the present invention is to provide a commutatorless motor of which the rotating speed is controlled by varying appropriately the time constant of the inverter circuit having transistors used therein.

A still further object of the present invention is to provide a commutatorless motor having an inverter circuit by which it can be appropriately decided the order of phase rotation which is determinative of the rotational direction of rotating magnetic fields.

Other objects and features of the present invention will be apparent from the following description with reference to the accompanying drawings in which;

FIG. 2 is a sectional plan view of an embodiment of the commutatorless motor of the present invention;

Figure 1:
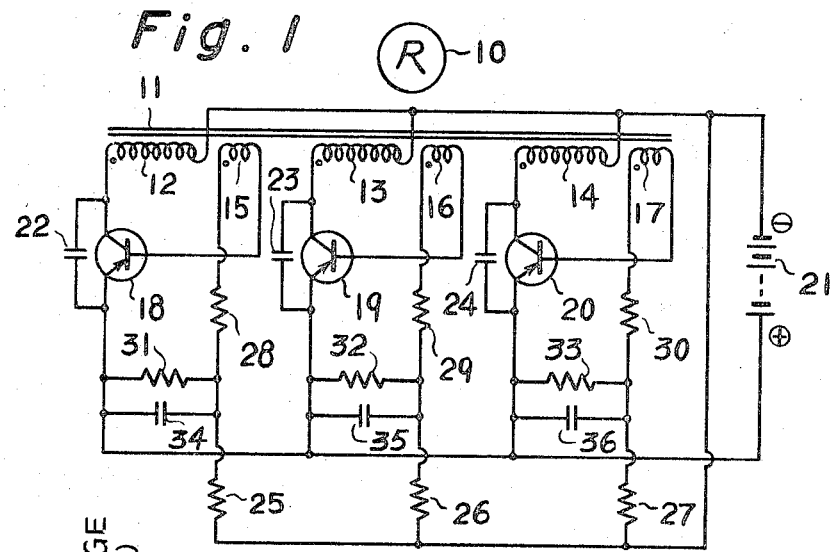
FIG. 1 illustrates an electric circuit of a first embodiment of the commutatorless motor according to the present invention.

FIGS. 3A 3A through 3F illustrate voltage waveforms between the collectors and emitters, and between the bases and emitters of respective transistors disposed in the circuit shown in FIG. 1;

FIGS. 4 and 5 illustrate respectively a circuit of second and third embodiments of the electrical circuit of the commutatorless motor, according to the present invention.

Referring to FIG. 1, there is diagrammatically illustrated a rotor 10 of the commutatorless motor according to the present invention. The rotor 10 may, depending upon required use of the motor, be either a rotor of induction motor or a rotor of hysteresis synchronous motor, or it may be a rotor of an induction motor that has permanent magnets bonded thereto. An iron core 11 is a yoke which forms a stator core of the motor and around which are wound symmetrical three-phase field coils 12, 13 and 14 and detection coils 15, 16 and 17.

FIG. 2 is a sectional plan view of an example of an outer rotor type motor embodying the present invention, and illustrating the assembled relation of the rotor 10, stator core 11, field coils 12, 13 and 14, and detecting coils 15, 16 and 17. These coils are wound in the same magnetic field such that the field coil 12 and the detection coil 15 are disposed in-phase, the field coil 13 and the detection coil 16 are located in-phase, and the field coil 14 and the detection coil 17 are positioned in the same phase.

Transistors 18, 19 and 20 are provided for forming an inverter circuit through their conductive and nonconductive operations. The emitters of the respective transistors 18, 19 and 20 are electrically connected to the plus side of a DC power source 21. The collectors of these transistors are connected to the field coils 12, 13 and 14 respectively, and the bases thereof are connected to the detection coils 15, 16 and 17, respectively.

Condensers 22, 23 and 24 are each connected between the emitter and the collector of each of the transistors 22, 23 and 24. Each of the condensers has a capacitance of such value as to resonate at a specific order of frequency with the inductance of each of the field coils 12, 13 and 14. Thus, the recurrency frequency of the inverter circuits are determined by the value of the inductance of the field coils 12, 13 and 14, and the value of the capacitance of the condensers 22, 23 and 24.

Resistors 25, 26 and 27 are starting resistors which are connected, at their one ends, to the minus side of the DC power source 21, and, at the other ends, to the respective detection coils 15, 16 and 17 through respective resistors 28, 29 and 30. This permits small quantity currents to flow to the 31, bases of the transistors 18, 19 and 20 when the power source 21 is placed in the circuit, thus, to start the circuit. The resistors 28, 29 and 30 are controlling resistors for controlling the feedback voltage when positively fed back to the bases of the respective transistors 18, 19 and 20 from the respective detection coils 15, 16 and 17 in which the voltage is generated.

Resistors 31, 32 and 33 are each connected between the respective emitters of the transistors 18, 19 and 20, and each of the junctions between respective starting resistors 25, 26 and 27 and corresponding controlling resistors 28, 29 and 30. The resistors 31, 32 and 33 each operate in association with the resistance of the respective controlling resistors 28, 29 and 30 to regulate the currents flowing from the respective starting resistors 25, 26 and 27 to the respective corresponding bases of transistors 18, 19 and 20 in an appropriate order.

Condensers 34, 35, and 36 are each disposed in parallel connection with each of the resistors 31, 32 and 33 and are able to vary selectively to some extent, the time constant in conjunction with the resistors 31, 32 and 33, and thereby the time during which the transistors 18, 19 and 20 are held in the nonconductive state.

Incidentally, it is required that the above-stated elements or parts constituting the circuit, are of as uniform a quality as possible. The operation of the circuit of the above-described arrangement will be described hereunder. When the DC power source 21 is put into the circuit, the current flowing to the field coil 12 connected to the collector of the transistor 18, is increased to some extent, and this results in an increase of voltage across the detection coil 15. The current flowing through the field coil 12 varies further in an increasing manner, and the transistor 18 is instantaneously switched to the conductive state. After the subsequent maintenance of this state for a fixed period, the current flowing to the field coil 12 attains a fixed value, reducing thereby the voltage generated in the detection coil 15. Thus the current flowing through the field coil 12 is reduced and, moreover, the variation in the voltage across the detection coil functions to reduce the current variation of the field coil 12. Therefore, the transistor 18 is abruptly switched to the nonconductive state.

There is a defined clearance between the opposite surfaces of the stator core 11 and the rotor 10, within the magnetic circuits formed by the field coils 12, 13 and 14 and the detection coils 15, 16 and 17 wound around the stator core 11. Thus, it is not necessary to take into consideration possible variations in permeability due to magnetic saturation. It is assured that voltage of the same phase is generated in each of the pair of the field coil 12 and the detection coil 15, the pair of the field coil 13 and the detection coil 16 and the pair of the field coil 14 and the detection coil 17. The arrangement and the operation of the above three circuits for respective phases are identical and the magnetic fluxes produced in the magnetic circuits by the currents flowing through the field coils of respective phases are also identical to each other. In this instance, the total of the magnetic fluxes passing through the three magnetic circuits generated by the currents flowing through the three field coils 12, 13 and 14 is always zero, as is in the theory on the formation of symmetrical three-phase transformer or three-phase motor. Therefore, the magnetic fluxes passing through the magnetic circuits of the three phases are symmetrical three-phase magnetic fluxes which respectively vary with phase difference of 120° being maintained between respective phases. In this situation, if effective value and frequency are determined, phase may naturally be determined. Thus, three circuits, one including the transistor 18, the field coil 12 and the detection coil 15, another including the transistor 19, the field coil 13 and the detection coil 16, and the remaining one including the transistor 20, the field coil 14 and the detection coil 17, perform, by virtue of the reciprocal converting operations of the transistors between their conductive and nonconductive states, switching operations having their phases displaced by 120° one after another, to thereby form a three-phase inverter circuit. Therefore, magnetic fluxes of symmetrical three phases pass through each of the pole shoes of the stator core which are disposed at positions spaced by electrical angles of 120° from one another. The magnetic fluxes produce a rotating field between the opposite surfaces of the stator 11 and the rotor 10 and, thus, the rotor 10 is rotated in the rotational direction of the rotating field. The magnetic fluxes passing through the magnetic circuit of three phases are only required to vary with phase differences of 120° being maintained therebetween and are not necessarily required to vary in sinusoidal wave form. The rotating speed of the rotor 10 can be easily controlled through appropriate selection of the time constant of the transistor inverter circuit.

Each of the field coils also acts as a transformer of the inverter circuit and, thus, the motor having the inverter circuit can be manufactured at a low cost. The commutatorless motor of the present invention has a further advantage in that the motor can be used not only as a DC motor, but can also be operated as an AC motor. In the latter use, the motor is driven by supplying either a symmetrical three-phase AC current, or a single phase AC current to the field coils of symmetrical three-phase, for example, to advance the phase.

Figure 3:
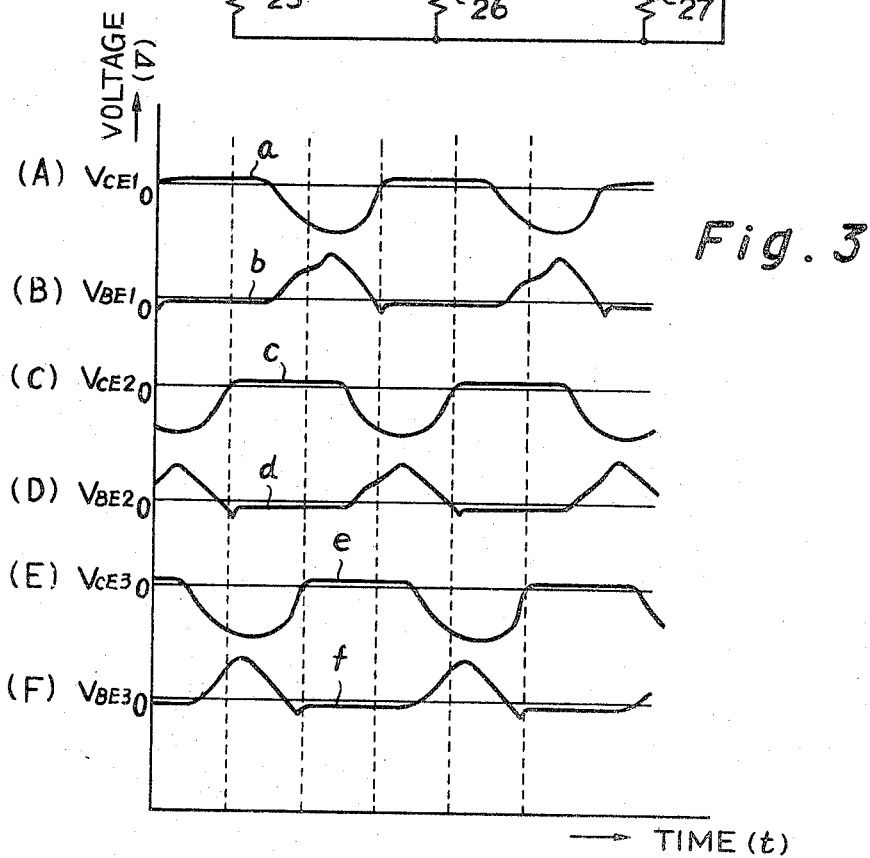

FIGS. 3A through 3F represent the methods of switching operations between conductive and nonconductive state of respective transistors in the above-described inverter circuit where the rotor 10 is a rotor for a squirrel cage induction motor. Of these FIGS. FIGS. 3A, 3C and 3E illustrate wave configurations of voltages between the collectors and emitters of respective transistors 18, 19, and 20. FIGS. 3B, 3D and 3F illustrate wave forms of voltages between the bases and emitters of respective transistors 18, 19 and 20. These figures indicate that each of the voltage waves a, c and e of the voltages $V_{CE}$ 1, $V_{CE}$ 2 and $V_{CE}$ 3 between the collectors and emitters of respective transistors 18, 19 and 20, corresponding to the conductive and nonconductive states thereof, has a phase difference of 120°. Furthermore, each of the voltage waves b, d and f of the voltages $V_{BE}$ 1, $V_{BE}$ 2 and $V_{BE}$ 3 between the bases and emitters of respective transistors 18, 19 and 20, corresponding to the conductive and nonconductive states thereof, has phase difference of 120°.

FIG. 4 is a diagrammatical illustration of a circuit of a second embodiment of the commutatorless motor according to the present invention. The circuit of this embodiment, as compared with the circuit of the preceeding embodiment, does not utilize the starting resistors 25, 26 and 27 connected in such a manner as shown in FIG. 1, but includes controlling resistors provided by resistors 40, 41 and 42 disposed between the field coil 12 and the controlling resistor 30, between the field coil 13 and the controlling resistor 28, and between the field coil 14 and the controlling resistor 29, respectively. The remainder of the circuit formation of the instant embodiment is the same as that in the first embodiment. The instant embodiment utilizes the fact that the electric potential at each of points 43, 44 and 45 is substantially equal to the electric potential at point 46 on the minus side of the DC power source 21 when the transistors 18, 19 and 20 are in nonconductive state and that the electric potential at each of the points 43, 44 and 45 is substantially equal to the electric potential at point 47 on the plug side of the source 21 when the transistors 18, 19 and 20 are in conductive state. First, since the electric potential at point 43 is substantially equal to the potential at point 47 when the transistor 18 is in conductive state, no starting current flows through the starting resistor 40 and to the base of the transistor 20. Furthermore, there is a tendency that the current flowing to the field coil 12 connected to the collector of the transistor 18 which is in conductive state increases, and since the magnetic fluxes generated by the field coil 12 interlink with the detection coil 17 so as to keep the transistor 20 inoperative, the same is nonconductive. In the nonconductive state of the transistor 20, the electric potential at the point 45 is equal to that at point 46 and, therefore, the resistors 42 and 29 apply voltage to the transistor 19, which, thereby, tends to be conductive. Subsequent to the conversion of the transistor 18 into its conductive state, therefore, the transistor 19 is converted into conductive state with phase difference of 120° being kept therebetween and, moreover, the transistor 20 becomes conductive with phase difference of 120° being maintained with respect to the transistor 19. This is followed by successive switching of the transistors 18, 19 and 20 to their conductive states in the mentioned order with phase differences of 120° being held therebetween in a manner similar to that described above, so that a predetermined order of the phase rotation is established. The rotor 10 is rotated in a rotational direction of the rotating field and, thus, the rotor 10 in this embodiment can have any of either rotational directions corresponding to an appropriately determined direction of the phase rotation.

FIG. 5 is a diagrammatical illustration of circuit of a third embodiment of the commutatorless motor according to the present invention. The circuit of the instant embodiment, as compared with the circuit of the first embodiment, does not utilize the starting resistors 25, 26 and 27 connected in such a manner as shown in FIG. 1, but includes starting resistors provided by a resistor 50 connected between the field coil 12 and the base of the transistor 20, a resistor 51 between the field coil 13 and the base of the transistor 18, and a resistor 52 between the field coil 14 and the base of the transistor 19. Also, the circuit of the instant embodiment neither has resistors such as 31, 32 and 33 in the circuit of the first embodiment, nor includes condensers such as 34, 35 and 36 of the embodiment. The remaining parts of the circuit of the instant embodiment is equivalent to those in the circuit of the first embodiment. The starting currents to the respective transistors 18, 19 and 20 depend upon the value of resistance of respective sets of resistors 50 and 30, of resistors 51 and 28, and of resistors 52 and 29. It is additionally pointed out that the positive feedback to the bases of respective transistors 18, 19 and 20 can be appropriately regulated by means of the detection coils 15, 16 and 17.

It is to be understood that the present invention is not limited to the specific embodiments above described, but can have various modifications without departing from the spirit of the invention.

I claim:

1. A commutatorless motor comprising a stator core having three poles disposed symmetrically with respect to the center of the stator; three field coils, at least one of said poles having one of said field coils would thereon; three detection coils, at least one of said poles having one of said detection coils would thereon; a DC power source; a transistor for each field coil, each transistor having emitter and collector electrodes electrically connected in series with the corresponding field coil across the DC power source; three condensers, each condenser being electrically connected across the collector electrode and the emitter electrode of each transistor; bias means for applying a bias voltage to the base electrode of each transistor with respect to the emitter voltage; means for electrically connecting one end of each detection coil to the base electrode of the corresponding transistor so that the induced voltage in each detection coil is in the same phase as the voltage across each corresponding field coil when a current flows through said corresponding field coil, whereby three intermittent oscillation currents through said three field coils have 120° phase displacement in sequence to one another so that the sum of the magnetic fluxes generated by the currents through said three field coils is zero in said stator core; and a rotor rotated by said magnetic fluxes, said oscillation currents alternating at a frequency determined substantially by the inductance of each field coil and the capacitance of each condenser.

2. A commutatorless motor as defined in claim 1 wherein each transistor has a collector electrode electrically connected to the positive terminal of said power source through the corresponding field coil and an emitter electrode electrically connected to the negative terminal of the power source.

3. A commutatorless motor as defined in claim 2 wherein said bias means comprises a series circuit of a first resistor and a parallel combination of a second resistor and a condenser connected across said power source, the junction point of said first resistor and said parallel combination being electrically connected to the other end of the corresponding detection coil through a third resistor.

4. A commutatorless motor as defined in claim 2 wherein said bias means comprises a series circuit of a first resistor and a parallel combination of a second resistor and a condenser connected between the junction point of the collector electrode of each transistor and the corresponding field coil and the emitter electrode of the adjacent transistor, the connecting point of the first resistor and the parallel combination being electrically connected through a third resistor to the other end of the corresponding detection coil to the adjacent transistor for establishing the direction of the phase displacement between said three intermittent oscillation currents.

5. A commutatorless motor as defined in claim 2 wherein said bias means comprises a first resistor electrically connected between the connecting point of the collector electrode of each transistor and the corresponding field coil and the base electrode of the adjacent transistor, and a second resistor electrically connected between the emitter electrode and the other end of the corresponding detection coil to the adjacent transistor for establishing the direction of the phase displacement between said three intermittent oscillation currents.